United States Patent [19]

Hardie-Muncy et al.

[11] Patent Number: 4,476,145

[45] Date of Patent: Oct. 9, 1984

[54] METHOD FOR AGGLOMERATING MOISTURE SENSITIVE MATERIALS

[75] Inventors: Darlene A. Hardie-Muncy, Bear; Guy C. Coker; Ronald P. Wauters, both of Dover, all of Del.

[73] Assignee: General Foods Corporation, White Plains, N.Y.

[21] Appl. No.: 363,978

[22] Filed: Mar. 31, 1982

[51] Int. Cl.$^3$ .............................................. A21D 2/00
[52] U.S. Cl. ................................... 426/285; 426/453; 426/555; 426/564
[58] Field of Search ............... 426/453, 285, 564, 555, 426/560

[56] References Cited

U.S. PATENT DOCUMENTS

| | | | |
|---|---|---|---|
| 518,891 | 4/1894 | Manwaring | 426/549 |
| 3,100,909 | 8/1963 | Schapiro | 426/285 |
| 3,409,442 | 11/1968 | Block et al. | 426/555 |
| 3,533,805 | 10/1970 | Nava et al. | 426/285 |
| 3,686,002 | 8/1972 | Nakano et al. | 426/274 |
| 3,809,758 | 5/1974 | Mathias et al. | 426/453 |
| 3,987,138 | 10/1976 | Hege | 264/117 |
| 4,208,442 | 6/1980 | Evans et al. | 426/296 |

*Primary Examiner*—George Yeung
*Attorney, Agent, or Firm*—Walter Scott; Thomas R. Savoie; Daniel J. Donovan

[57] ABSTRACT

Moisture sensitive materials are agglomerated by a process that does not disrupt the structure of these materials. A first fraction of the moisture sensitive materials are coated with a hydrophylic binding agent foam and then contacted with the remaining materials. The agglomerated mixture is then dried to a final product moisture.

9 Claims, No Drawings

METHOD FOR AGGLOMERATING MOISTURE SENSITIVE MATERIALS

This invention relates to a new and improved process for the aggregation of moisture sensitive materials and such aggregated materials. More particularly, this invention relates to a means of agglomerating food materials whose structure is moisture sensitive and collapses upon exposure to the moisture levels used in traditional agglomeration methods.

Food processors desire to package their food products in a manner compatable with the broadest range of consumer needs. Consumers, on the other hand, require the freedom to choose their own serving size. Consequently, foodstuffs are packaged to optimize the consumer's choice of serving sizes whenever practicable. However, free-flowing mixtures of different size and density particles segregate after packaging, thereby restricting the feasible serving sizes to one: the entire package. Generally, the art has corrected this problem by agglomerating the segregating mixture to produce a non-segregating mixture.

In the past, foods have been agglomerated by a variety of methods, including: steaming and contacting the moistened food particles; moistening and pressing the food particles together, U.S. Pat. No. 518,891 issued to Manwaring; and blending a solid food or foods with an aqueous or an aqueous miscible fluid, U.S. Pat. No. 3,100,909 issued to Schapiro. However, the structure of some foodstuffs, e.g. bread crumbs, collapses at intermediate and high moistures when agitated, thus precluding the use of agglomeration methods wherein the foodstuff is moistened to these levels. Consequently, Hege, U.S. Pat. No. 3,987,138, developed a low moisture method of agglomeration. Hege teaches the use of a small amount of water dispersed in a large volume of a nonmiscible, inert, liquid carrier to lightly moisten the food. However, this procedure, may leave an unacceptable residue of the nonmiscible, inert, liquid carrier in the food.

Block et al., U.S. Pat. No. 3,409,442, teaches a procedure that produces a single particle by aggregating dry ingredients with a foamed, edible binder. According to the Block et al. disclosure, the foam and not the dry ingredients, provides the agglomerated particle with its structure. Furthermore, the Block et al. teaching directs the production of a perceptually moist product. Consequently, Block et al. disclose that the foaming agent should constitute only about 2% of the foam and that the foam overrun is limited to between 150 to 250%. In the Block et al. process, the foam moistens, agglomerates, and provides the framework for the dry ingredients.

SUMMARY OF THE INVENTION

This invention involves a process for agglomerating materials, especially food materials and is most useful for agglomerating porous food materials whose structure or other properties are likely to collapse when exposed to moderate or high mositure and agitated. Leavened, baked and dried farinaceous materials, such as bread crumbs and croutons, are suitable for use in this invention. A hydrophylic binding agent is dissolved in water and whipped so as to form a very high overrun foam. This foam is then coated on one portion of the ingredients. The other ingredients are added to the foam-coated material and the combination is well mixed. The resulting mixture is then dried to an acceptable final moisture. This dried agglormerated material may be fractured, granulated, or otherwise divided into smaller pieces.

DETAILED DESCRIPTION OF THE INVENTION

Processed foods are agglomerated for a number of reasons. The desire to either increase particle size, or to produce a new texture, are traditional reasons for agglomerating foodstuffs. A further reason for agglomerating processed food is to produce a non-segregating mixture of different size or density particles.

The present method consists of dissolving or dispersing a hydrophylic binding agent in water. It is preferred that the hydrophylic binding agent be selected from the group comprising: egg whites; hydrolyzed water soluble proteinaceous vegetable extract, such as soy bean meal, gliadin, and the whippable proteins isolated from sources such as oats, corn and hemp; malto-dextrins; edible grades of modified cellulosic materials, such as water soluble salts of carboxymethyl cellulose and ionic esters and ethers of cellulose, for example alkyl celluloses including methyl cellulose; tapioca, potato, corn and wheat starch derivitives; hydrophilic gelationous substances or colloids including various sea weed extracts (e.g. algin and carrageenin), Eucheuma, pectin, gum arabic, gum tragacanth and gum karaya, and gelatin, especially gelatin of high bloom. It is preferred that the hydrophylic binding agent be a hydrophylic gelatinous substance or colloid, and it is more preferred that this hydrophylic binding agent be a gelatin of high bloom, in particular, a bloom between 250 and 290.

Sufficient hydrophylic binding agent is added to water so as to form a solution containing between 0.1 and 20% by weight of the hydrophylic binding agent. It is preferred that this solution be between 3.5 and 15% by weight and it is most preferred that this solution be between 4 and 9% hydrophylic binding agent by weight. Furthermore, if gelatin is used as the hydrophylic binding agent, it is preferred that the binding agent be disolved in water at a temperature greater than 90° C. After dissolving the hydrophylic binding agent in the water, the solution is then cooled to at least 65° C. It is preferred that this solution be cooled to at least 50° C. and more preferred that the solution is cooled to a temperature below 35° C. The solution is then whipped at a high speed for a short period of time until soft peaks are formed. It is preferred that the whipped solution have a overrun is between 350 and 750%. It is more preferred that the overrun is between 400 and 700%, and most preferred that the overrun is between 475 and 625%.

Either the largest sized particles, the least readily hydrated particles, or a combination of both of these particle types are added to the high overrun foam. This composition is then well mixed; with the mixing complete when the foam has collapsed and formed a film which lightly coats the added particles. Consequently, these particles are sticky and tacky, but free from obvious white patches of foam. These foam-coated particles are produced by combining in a weight ratio from about one part of the foam to about one twentieth of a part of the particles to about one part of the foam to about 20 parts of the particles. (1:0.05 to 1:20) It is preferred that this ratio of foam to particles be between about one to about one tenth and about one to ten (1:0.1 to 1:10) and it is most preferred that this ratio of foam to particles be between about one to about one third to about one to about three (1:0.33 to 1:3).

Once the first batch of particles has been foam coated, the remaining particles are added. The addition of the remaining materials may be either in one batch, or in several. Best results will be obtained when any foam degradating ingredients—spices and other very finely sized particles—are added last. In general, the amount of material to be agglomerated onto the foam-coated particles will be between one tenth to ten times, by weight, of the foam-coated ingredients. It is more preferred that the subsequently added ingredients be between one fifth and five times the material originally coated, and it is most preferred that between one quarter and three times the amount of coated material is added in the later steps. The resulting combination is then thoroughly mixed. This mixture is dried by any conventional process; including continuous moving belt, hot air tumbling, and vibratory bed dryers. Preferably, the product is dried to a moisture of less than 15%. However, it more preferred that the final moisture be less than 10% and most preferred that it less than 7%. Nevertheless, too low of a final moisture is also undesirable, as rancid bread flavors develop at low moisture levels. Thus, it is preferred that the final moisture be at least 3%, and preferably at least 4%.

EXAMPLE 1

High bloom gelatin, 6.39 grams of 270 bloom, were dissolved in 96.0 grams of boiling water (100° C.). This gelatin solution was then cooled to 30° C. and whipped, at a high speed, in a five quart Hobart Mixer for 3 to 5 minutes. The appearance of soft peaks and a 550% overrun signified complete whipping. A dehydrated vegetable mixture comprising 3.84 grams of dehydrated onion, 0.60 grams of parsley and 2.40 grams of dehydrated celery were added to the foam and blended. Large breadcrumbs, 139.26 grams, were then added to the dehydrated vegetable-foam mixture. These large breadcrumbs, both rich and lean, passed through a U.S. Seive size numbr 2½ mesh screen and were retained on a U.S. Seive size number 5 mesh screen. After the addition of the large breadcrumbs, the combination was well blended, with a bench top churn (candy coater). Lastly, 34.9 grams of small bread crumbs: those passing through a number 14 U.S. Seive size but retained on a number 50 U.S. Seive size seive, and 18 grams of a seasoning blend were added and the combination was again thoroughly mixed so as to distribute all of the materials uniformly. The seasoning blend was comprised of poultry season, pepper and monosodium glutamate.

The foam agglomerated mixture was then spread out evenly upon a drying tray and dried. Air, 11 cubic meters per minute at 54° to 60° C., dried the agglomerate in a 3 centimeter deep bed in 13 minutes.

The dried, foam-agglomerate was then granulated by pushing the agglomerate through a Sweco separator and further seived to produce fractions which would be retained on successive screens of the following U.S. Seive sizes: 2½, 14, 50. A combination comprising 69.27 grams of the material retained on the U.S. Seive size number 2½ screen, 141.71 grams of the material retained on the U.S. Seive size number 14 screen, and 6.79 grams of the material retained on the U.S. Seive size number 50 screen was packaged.

Water, 80 milliliters, was combined with 5 grams butter in a saucepan and the mixture was boiled. To the boiling water, 120 milliliters of the dried, granulated, foam-agglomerate was stirred in. The mixture was covered, removed from the heat, and allowed to sit for 5 minutes. Once cooked, the product was fluffed with a fork, and served.

EXAMPLE 2

The large breadcrumb fraction, the dehydrated vegetables, the small breadcrumb fraction, and the seasoning, in the amounts specified in Example 1 were combined (199 grams) and packaged without foam agglomeration. Thereafter, a sample, 120 milliliters, (about 33 grams or one sixth of the package) of this Example 2 combination was cooked and served in the same manner as Example 1.

EXAMPLE 3

Fifty-six grams of butter were combined with 470 milliliters of water in a saucepan and brought to a boil. To this boiling solution, the full package (199 grams) according to Example 2 was added, cooked, and served according to the directions of Example 1.

A comparison of the cooked products of Examples 1, 2, and 3 showed that Examples 1 and 3 were very similar: uniform in texture, appearance, and taste. In marked contrast, Example 2 was very variable and therefore unacceptable. The Example 2 and 3 mixtures segregated considerably in their respective packages and made a representative, 120 milliliter sample of Example 2 unobtainable. As the entire Example 3 package was used, segregation was not problematic in that sample.

What is claimed is:
1. A process for making a nonsegregating, free flowing, dehydrated food mixture from a plurality of particulate, dehydrated ingredients comprising:
   a. dissolving a hydrophylic binding agent in water in a manner effective to produce a hydrophylic binding agent solution containing between 3 and 20% by weight of the hydrophylic binding agent;
   b. whipping the hydrophlic binding agent solution to produce a foam with an overrun between 350 and 750%;
   c. adding between about one twentieth and about twenty parts of the dehydrated ingredients to each part of the foam;
   d. mixing the dehydrated ingredient and foam admixture in a manner effective to produce foam coated ingredients;
   e. adding between one tenth and ten parts of uncoated ingredients to each part of foam-coated ingredients, wherein said uncoated ingredients having a size and density profile different from the foam-coated ingredients;
   f. thoroughly mixing the foam-coated and uncoated ingredient admixture; and
   g. drying the product to a final moisture of less than 15% to produce a nonsegregating, free flowing, dehydrated mixture.
2. A process according to claim 1 wherein between 4 and 9% by weight of the hydrophylic binding agent solution is hydrophylic binding agent.
3. A process according to claim 1 wherein the hydrophylic binding agent solution is whipped to form a foam with an overrun between 475 and 625%.
4. A process according to claim 1 wherein the hydrophylic binding agent is chosen from the group consisting of methylcelluloses, starches, hydrophylic gelatinous substances, and combinations thereof.
5. A process according to claim 4 wherein the hydrophylic binding agent is gelatin.

6. A process according to claim 5 wherein the gelatin is a high bloom gelatin.

7. A process according to claim 1 wherein the agglomerated material is granulated after drying.

8. A process according to claim 5 which further comprises heating said water to a temperature greater than 90° C. before dissolving the hydrophylic binding agent in said water.

9. A process according to claim 8 wherein the hydrophylic binding agent solution is cooled to below 50° C. before whipping.

* * * * *